(12) United States Patent
Khripin et al.

(10) Patent No.: US 10,105,850 B2
(45) Date of Patent: *Oct. 23, 2018

(54) NATURAL PITCH AND ROLL

(71) Applicant: Boston Dynamics, Inc., Waltham, MA (US)

(72) Inventors: Alex Khripin, Cambridge, MA (US); Alfred Anthony Rizzi, Belmont, MA (US)

(73) Assignee: Boston Dynamics, Inc., Waltham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/495,905

(22) Filed: Apr. 24, 2017

(65) Prior Publication Data
US 2017/0225333 A1 Aug. 10, 2017

Related U.S. Application Data

(63) Continuation of application No. 14/659,012, filed on Mar. 16, 2015, now Pat. No. 9,662,792.

(Continued)

(51) Int. Cl.
G05B 15/00 (2006.01)
B25J 9/16 (2006.01)
B62D 57/032 (2006.01)

(52) U.S. Cl.
CPC .......... B25J 9/1694 (2013.01); B25J 9/1664 (2013.01); B62D 57/032 (2013.01);
(Continued)

(58) Field of Classification Search
CPC combination set(s) only.
See application file for complete search history.

(56) References Cited

U.S. PATENT DOCUMENTS 5,121,805 A 6/1992 Collie
5,343,397 A * 8/1994 Yoshino ............... B62D 57/032
180/8.1
(Continued)

FOREIGN PATENT DOCUMENTS

EP 0965416 12/1999
EP 1642687 4/2006
(Continued)

OTHER PUBLICATIONS

Geijtenbeek et al., "Flexible Muscle-Based Locomotion for Bipedal Creatures," ACM Transactions on Graphics, 2013, 11 pages, vol. 32, No. 6.

(Continued)

Primary Examiner — Khoi H Tran
Assistant Examiner — Jorge O Peche
(74) Attorney, Agent, or Firm — Honigman Miller Schwartz and Cohn LLP

(57) ABSTRACT

A control system may receive a first plurality of measurements indicative of respective joint angles corresponding to a plurality of sensors connected to a robot. The robot may include a body and a plurality of jointed limbs connected to the body associated with respective properties. The control system may also receive a body orientation measurement indicative of an orientation of the body of the robot. The control system may further determine a relationship between the first plurality of measurements and the body orientation measurement based on the properties associated with the jointed limbs of the robot. Additionally, the control system may estimate an aggregate orientation of the robot based on the first plurality of measurements, the body orientation measurement, and the determined relationship. Further, the control system may provide instructions to control at least one jointed limb of the robot based on the estimated aggregate orientation of the robot.

20 Claims, 8 Drawing Sheets

Related U.S. Application Data

(60) Provisional application No. 62/041,281, filed on Aug. 25, 2014.

(52) U.S. Cl.
CPC .............. *G05B 2219/39082* (2013.01); *G05B 2219/39215* (2013.01); *G05B 2219/39325* (2013.01); *G05D 2201/0217* (2013.01); *Y10S 901/01* (2013.01); *Y10S 901/09* (2013.01); *Y10S 901/46* (2013.01)

(56) References Cited

U.S. PATENT DOCUMENTS

| | | | |
|---|---|---|---|
| 6,301,524 B1 * | 10/2001 | Takenaka ............... | B62D 57/02 318/568.12 |
| 6,584,377 B2 | 6/2003 | Saijo et al. | |
| 6,594,552 B1 | 7/2003 | Nowlin et al. | |
| 6,643,563 B2 | 11/2003 | Hosek et al. | |
| 8,083,013 B2 * | 12/2011 | Bewley ................... | B62D 37/00 180/199 |
| 8,160,747 B1 * | 4/2012 | Blackwell ................ | B25J 9/162 700/245 |
| 8,242,730 B2 | 8/2012 | Nichols et al. | |
| 8,271,138 B2 | 9/2012 | Eliuk et al. | |
| 8,442,661 B1 * | 5/2013 | Blackwell .............. | B25J 9/1689 700/245 |
| 8,583,285 B2 | 11/2013 | Aurnhammer et al. | |
| 8,639,386 B2 | 1/2014 | Summer et al. | |
| 8,644,986 B2 | 2/2014 | Tsuboi et al. | |
| 9,395,726 B1 * | 7/2016 | Rizzi ..................... | B62D 57/032 |
| 9,440,353 B1 * | 9/2016 | da Silva ................. | B25J 9/1605 |
| 2003/0120388 A1 * | 6/2003 | Kuroki .................. | B62D 57/032 700/245 |
| 2005/0107916 A1 * | 5/2005 | Nagasaka .............. | B62D 57/02 700/245 |
| 2005/0113973 A1 | 5/2005 | Endo et al. | |
| 2005/0240307 A1 * | 10/2005 | Kuroki ................... | B25J 13/085 700/245 |
| 2007/0050088 A1 * | 3/2007 | Murray, IV ............. | B25J 9/161 700/250 |
| 2007/0054777 A1 * | 3/2007 | Kawai ..................... | A61H 3/00 482/1 |
| 2007/0168080 A1 | 7/2007 | Takenaka et al. | |
| 2007/0260356 A1 | 11/2007 | Kock et al. | |
| 2009/0171503 A1 * | 7/2009 | Takenaka .............. | B62D 57/032 700/250 |
| 2009/0187275 A1 * | 7/2009 | Suga .................... | B62D 57/032 700/245 |
| 2009/0312867 A1 * | 12/2009 | Hasegawa ............ | B62D 57/032 700/245 |
| 2010/0126785 A1 * | 5/2010 | Shimada ............... | B62D 57/032 180/8.1 |
| 2011/0066283 A1 | 3/2011 | Hammam et al. | |
| 2011/0071677 A1 * | 3/2011 | Stilman ................... | B25J 5/007 700/254 |
| 2011/0231050 A1 * | 9/2011 | Goulding ............. | B62D 57/024 701/26 |
| 2012/0029696 A1 * | 2/2012 | Ota ......................... | A61H 3/04 700/250 |
| 2012/0158181 A1 * | 6/2012 | Seo ....................... | B62D 57/032 700/261 |
| 2012/0245735 A1 * | 9/2012 | Lee ....................... | B62D 57/032 700/255 |
| 2012/0265498 A1 | 10/2012 | Choi et al. | |
| 2012/0303162 A1 * | 11/2012 | Orita ..................... | B25J 9/1664 700/275 |
| 2012/0316682 A1 * | 12/2012 | Seo ....................... | B62D 57/032 700/261 |
| 2012/0316683 A1 * | 12/2012 | Seo ....................... | B62D 57/032 700/261 |
| 2013/0079929 A1 * | 3/2013 | Lim ...................... | B62D 57/032 700/250 |
| 2013/0184870 A1 * | 7/2013 | Ota ........................ | B25J 9/1669 700/262 |
| 2013/0310979 A1 * | 11/2013 | Herr ...................... | B25J 9/1694 700/258 |
| 2014/0121832 A1 | 5/2014 | Sasai | |
| 2014/0249670 A1 | 9/2014 | Yamane | |
| 2014/0257558 A1 | 9/2014 | Frische et al. | |
| 2016/0023647 A1 * | 1/2016 | Saunders ................. | B25J 3/04 701/22 |
| 2016/0052574 A1 * | 2/2016 | Khripin .................. | B25J 9/1694 700/245 |

FOREIGN PATENT DOCUMENTS

| | | |
|---|---|---|
| EP | 1721711 | 11/2006 |
| JP | 2011-224757 A | 11/2011 |

OTHER PUBLICATIONS

Non-Final Office Action dated Apr. 4, 2016, issued in connection with U.S. Appl. No. 14/584,558, filed Dec. 29, 2014, 14 pages.

International Searching Authority, International Search Report and Written Opinion dated May 30, 2016, issued in connection with International Patent Application No. PCT/US2015/045253, filed on Aug. 14, 2015, 16 pages.

Non-Final Office Action dated Mar. 14, 2016 for U.S. Appl. No. 14/586,519, filed Dec. 30, 2014.

Japanese Office Action for the related for the application No. 2016-572822 dated Mar. 16, 2018.

European Patent Office, Office Action, Application No. 15754383.6, dated May 15, 2018, 8 pages.

\* cited by examiner

NATURAL PITCH AND ROLL

CROSS-REFERENCE TO RELATED APPLICATIONS

This application claims priority to U.S. patent application Ser. No. 14/659,012 filed on Mar. 16, 2015 and entitled "Natural Pitch and Roll," which claims priority to U.S. Provisional Patent Application Ser. No. 62/041,281 filed Aug. 25, 2014 and entitled "Natural Pitch and Roll," which are each herein incorporated by reference as if fully set forth in this description.

BACKGROUND

As technology advances, various types of robotic devices are being created for performing a variety of functions that may assist users. Robotic devices may be used for applications involving material handling, transportation, welding, assembly, and dispensing, among others. Over time, the manner in which these robotic systems operate is becoming more intelligent, efficient, and intuitive. As robotic systems become increasingly prevalent in numerous aspects of modern life, it is desirable for robotic systems to be efficient. Therefore, a demand for efficient robotic systems has helped open up a field of innovation in actuators, movement, sensing techniques, as well as component design and assembly.

SUMMARY

The present application discloses implementations that relate to controlling a position of a leg of a robotic device to balance the robotic device. An example implementation may include receiving, by a robot, a first plurality of measurements indicative of respective joint angles corresponding to a plurality of sensors connected to the robot. The robot may include a body and a plurality of jointed limbs connected to the body. The jointed limbs may be associated with respective properties. The implementation may also include receiving a body orientation measurement indicative of an orientation of the body of the robot. The implementation may further include determining a relationship between the first plurality of measurements and the body orientation measurement based on the properties associated with the jointed limbs of the robot. Additionally, the implementation may include estimating an aggregate orientation of the robot based on the first plurality of measurements, the body orientation measurement, and the determined relationship. Further, the implementation may include providing instructions to control at least one jointed limb of the robot based on the estimated aggregate orientation of the robot.

In another example implementation, the present application describes a robot that may include a body, a plurality of jointed limbs connected to the body, a first plurality of sensors, a second sensor, a processing system, and a control system. The jointed limbs may be associated with respective properties. The first plurality of sensors may be configured to provide a first plurality of measurements indicative of respective joint angles of the jointed limbs. The second sensor may be configured to provide a body orientation measurement indicative of an orientation of the body of the robot. The second sensor may be coupled to the body. The processing system may be configured to determine a relationship between the first plurality of measurements and the body orientation measurement based on the properties associated with the jointed limbs. The processing system may also be configured to estimate an aggregate orientation of the robot based on the first plurality of measurements, the body orientation measurement, and the determined relationship. The control system may be configured to provide instructions to control at least one jointed limb of the robot based on the estimated aggregate orientation of the robot In yet another example implementation, the present application describes a non-transitory computer-readable medium having stored thereon instructions that, upon execution by at least one processor, causes a robot to perform a set of operations. The operations may include receiving a first plurality of measurements indicative of respective joint angles corresponding to a plurality of sensors connected to a robot. The robot may include a body and a plurality of jointed limbs connected to the body. The jointed limbs may be associated with respective properties. The operations may also include receiving a body orientation measurement indicative of an orientation of a portion of the robot, wherein the portion of the robot corresponds to a particular frame of reference. The operations may further include determining a relationship between the first plurality of measurements and the body orientation measurement based on the properties associated with the jointed limbs of the robot. Additionally, the operations may include estimating an aggregate orientation of the robot based on the first plurality of measurements, the body orientation measurement, and the determined relationship. Further, the operations may include providing instructions to control at least one jointed limb of the robot based on the estimated aggregate orientation of the robot.

In yet still another implementation, the present application describes a system. The system may include a means for receiving, by a robot, a first plurality of measurements indicative of respective joint angles corresponding to a plurality of sensors connected to the robot. The robot may include a body and a plurality of jointed limbs connected to the body. The jointed limbs may be associated with respective properties. The system may also include a means for receiving a body orientation measurement indicative of an orientation of the body of the robot. The system may further include a means for determining a relationship between the first plurality of measurements and the body orientation measurement based on the properties associated with the jointed limbs of the robot. Additionally, the system may include a means for estimating an aggregate orientation of the robot based on the first plurality of measurements, the body orientation measurement, and the determined relationship. Further, the system may include a means for providing instructions to control at least one jointed limb of the robot based on the estimated aggregate orientation of the robot.

These as well as other aspects, advantages, and alternatives, will become apparent to those of ordinary skill in the art by reading the following detailed description, with reference where appropriate to the accompanying figures.

DETAILED DESCRIPTION

Figure 1:
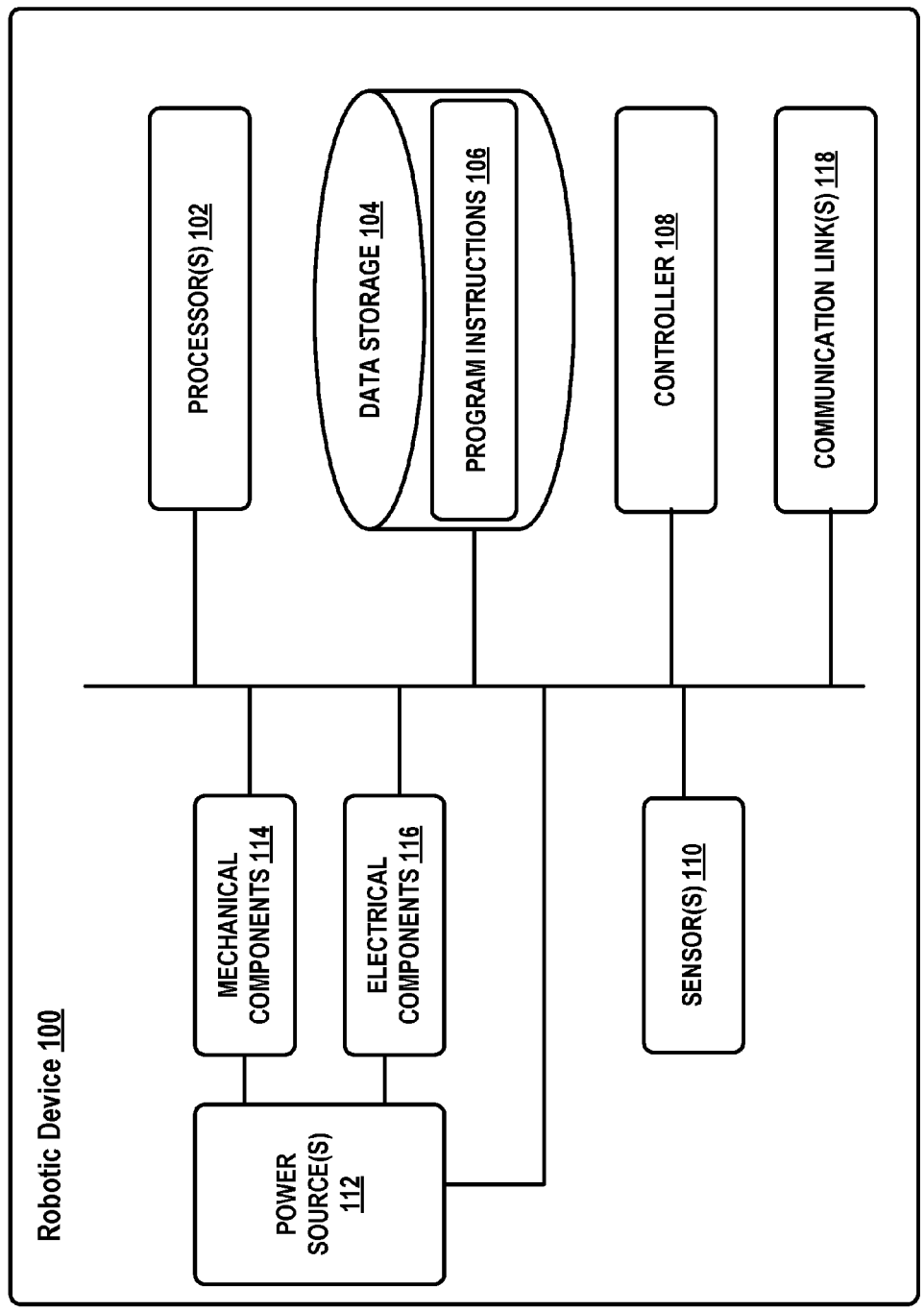
FIG. 1 illustrates a configuration of a robotic system, according to an example implementation.

The following detailed description describes various features and functions of the disclosed systems and methods with reference to the accompanying figures. The illustrative system and method implementations described herein are not meant to be limiting. It may be readily understood that certain aspects of the disclosed systems and methods can be arranged and combined in a wide variety of different configurations, all of which are contemplated herein.

I. Overview

An example implementation involves a robotic device configured with at least one robotic limb, sensors, and a processing system. The robotic limb may be an articulated robotic appendage including a number of members connected by joints. The robotic limb may also include a number of actuators (e.g. 2-5 actuators) coupled to the members of the limb that facilitate movement of the robotic limb through a range of motion limited by the joints connecting the members. The sensors may be configured to measure properties of the robotic device, such as angles of the joints, pressures within the actuators, and/or the position, velocity, and acceleration of members of the robotic limb at a given point in time. The sensors may also be configured to measure an orientation (i.e. the body orientation measurement) of the body of the robotic device (which may also be referred to herein as the "base" of the robotic device). Other example properties include the masses of various components of the robotic device, the location of the center of mass of the robotic device or of various components of the robotic device, the moment of inertia of the robotic device or of components of the robotic device, among other properties. The processing system of the robotic device may determine the angles of the joints of the robotic limb either directly from angle sensor information or indirectly from other sensor information from which the joint angles can be calculated. The processing system may then estimate an orientation of the robotic device based on the sensed orientation of the base of the robotic device and the joint angles.

An orientation may herein refer to an angular position of an object. In some instances, an orientation may refer to an amount of rotation (in degrees or radians) about three axes. In some cases, an orientation of a robotic device may refer to the orientation of the robotic device with respect to a particular reference frame, such as the ground or a surface on which it stands. An orientation may describe the angular position using Euler angles or Tait-Bryan angles (also known as yaw, pitch, and roll angles). In some instances, such as on a computer-readable medium, the orientation may be represented by an orientation matrix or by an orientation quaternion, among other representations.

In some scenarios, measurements from sensors on the base of the robotic device may indicate that the robotic device is oriented in such a way and/or has an angular velocity that requires control of one or more of the articulated appendages in order to maintain balance of the robotic device. In these scenarios, however, it may be the case that the limbs of the robotic device are oriented and/or moving such that balance control is not required. For example, the body of the robotic device may be tilted to the left, and sensors measuring the body's orientation may thus indicate a need to move limbs to balance the robotic device; however, one or more limbs of the robotic device may be extended to the right, causing the robotic device to be balanced despite the sensors on the base of the robotic device indicating otherwise. The limbs of a robotic device may apply a torque on the body of the robotic device and may also affect the robotic device's center of mass. Thus, orientation and angular velocity measurements of one portion of the robotic device may be an inaccurate representation of the orientation and angular velocity of the combination of the robotic device's body and limbs (which may be referred to herein as the "aggregate" orientation and angular velocity).

In some implementations, the processing system may be configured to estimate the aggregate orientation and/or angular velocity of the entire robotic device based on the sensed orientation of the base of the robotic device and the measured joint angles. The processing system have stored thereon a relationship between the joint angles of the robotic device and the extent to which the joint angles of the robotic device affect the orientation and/or angular velocity of the base of the robotic device. The relationship between the joint angles of the robotic device and the motion of the base of the robotic device may be determined based on the kinematics and mass properties of the limbs of the robotic devices. In other words, the relationship may specify the effects that the joint angles have on the aggregate orientation and/or angular velocity of the robotic device. Additionally, the processing system may be configured to determine components of the orientation and/or angular velocity of the robotic device caused by internal motion and components of the orientation and/or angular velocity of the robotic device caused by external motion. Further, the processing system may differentiate components of the aggregate orientation in order to determine the robotic device's aggregate yaw rate, pitch rate, and roll rate (which may be collectively referred to as the "aggregate angular velocity").

In some implementations, the robotic device may also include a control system that is configured to control the robotic device on the basis of a simplified model of the robotic device. The control system may be configured to receive the estimated aggregate orientation and/or angular velocity of the robotic device, and subsequently control one or more jointed limbs of the robotic device to behave in a certain manner (e.g. maintain the balance of the robotic device). For instance, the control system may determine locations at which to place the robotic device's feet and/or the force to exert by the robotic device's feet on a surface based on the aggregate orientation.

In some implementations, the robotic device may include force sensors that measure or estimate the external forces (e.g. the force applied by a leg of the robotic device against the ground) along with kinematic sensors to measure the orientation of the limbs of the robotic device. The processing system may be configured to determine the robotic device's angular momentum based on information measured by the sensors. The control system may be configured with a feedback-based state observer that receives the measured angular momentum and the aggregate angular velocity, and provides a reduced-noise estimate of the angular momentum of the robotic device. The state observer may also receive measurements and/or estimates of torques or forces acting on the robotic device and use them, among other information, as a basis to determine the reduced-noise estimate of the angular momentum of the robotic device. In some instances, the measured angular momentum includes noise having a first average amplitude (e.g. −80 decibels to −20 decibels), and the reduced-noise estimate of the angular momentum includes noise having a second average amplitude (e.g. −70 decibels to −10 decibels). In some cases, the second average amplitude of the noise is less than the first average amplitude of the noise, such that the state observer acts to reduce the average amplitude of the noise.

The control system may be configured to actuate one or more actuators connected across components of a robotic leg. The actuators may be controlled to raise or lower the robotic leg. In some cases, a robotic leg may include actuators to control the robotic leg's motion in three dimensions. Depending on the particular implementation, the control system may be configured to use the aggregate orientation, along with other sensor measurements, as a basis to control the robot in a certain manner (e.g. stationary balancing, walking, running, galloping, etc.).

In some implementations, multiple relationships between the joint angles and their effect on the orientation and/or angular velocity of the base of the robotic device may be stored on the processing system. The processing system may select a particular relationship with which to determine the aggregate orientation and/or angular velocity based on the joint angles. For example, one relationship may be associated with a particular joint being between 0 and 90 degrees, and another relationship may be associated with the particular joint being between 91 and 180 degrees. The selected relationship may more accurately estimate the aggregate orientation of the robotic device than the other relationships.

In some implementations, the processing system may have stored thereon more than one relationship between the joint angles of the robotic device and the extent to which the joint angles of the robotic device affect the orientation and/or angular velocity of the base of the robotic device. Each relationship may correspond to one or more ranges of joint angle values (i.e. operating ranges).

In some implementations, the robotic device may operate in one or more modes. A mode of operation may correspond to one or more of the joint angles being within a corresponding set of operating ranges. In these implementations, each mode of operation may correspond to a certain relationship.

The angular velocity of the robotic device may have multiple components describing the robotic device's orientation (i.e. rotational angles) along multiple planes. From the perspective of the robotic device, a rotational angle of the robotic device turned to the left or the right may be referred to herein as "yaw." A rotational angle of the robotic device upwards or downwards may be referred to herein as "pitch." A rotational angle of the robotic device tilted to the left or the right may be referred to herein as "roll." Additionally, the rate of change of the yaw, pitch, and roll may be referred to herein as the "yaw rate," the "pitch rate," and the "roll rate," respectively.

II. Example Robotic Systems

Referring now to the figures, FIG. 1 illustrates an example configuration of a robotic device, according to an example implementation. The robotic system 100 represents an example robotic device configured to perform the operations described herein. Additionally, the robotic device 100 may be configured to operate autonomously, semi-autonomously, and/or using directions provided by user(s), and may exist in various forms, such as a humanoid robot or a quadruped robot, among other examples. Furthermore, the robotic device 100 may also be referred to as a robotic device, mobile robot, or robot, among other designations.

As shown in FIG. 1, the robotic device 100 includes processor(s) 102, data storage 104, program instructions 106, controller 108, sensor(s) 110, power source(s) 112, mechanical components 114, and electrical components 116. Note that the robotic device 100 is shown for illustration purposes and may include more or less components without departing from the scope of the disclosure herein. The various components of robotic device 100 may be connected in any manner, including wired or wireless connections, etc. Further, in some examples, components of the robotic device 100 may be positioned on multiple distinct physical entities rather on a single physical entity. Other example illustrations of robotic device 100 may exist as well.

Processor(s) 102 may operate as one or more general-purpose processor or special purpose processors (e.g., digital signal processors, application specific integrated circuits, etc.). The processor(s) 102 can be configured to execute computer-readable program instructions 106 that are stored in the data storage 104 and are executable to provide the operations of the robotic device 100 described herein. For instance, the program instructions 106 may be executable to provide operations of controller 108, where the controller 108 may be configured to cause activation and deactivation of the mechanical components 114 and the electrical components 116. The processor(s) 102 may operate and enable the robotic device 100 to perform various functions, including the functions described herein.

The data storage 104 may exist as various types of storage media, such as a memory. For example, the data storage 104 may include or take the form of one or more computer-readable storage media that can be read or accessed by processor(s) 102. The one or more computer-readable storage media can include volatile and/or non-volatile storage components, such as optical, magnetic, organic or other memory or disc storage, which can be integrated in whole or in part with processor(s) 102. In some implementations, the data storage 104 can be implemented using a single physical device (e.g., one optical, magnetic, organic or other memory or disc storage unit), while in other implementations, the data storage 104 can be implemented using two or more physical devices, which may communicate via wired or wireless communication. Further, in addition to the computer-readable program instructions 106, the data storage 104 may include additional data such as diagnostic data, among other possibilities.

The robotic device 100 may include at least one controller 108, which may interface with the robotic device 100. The controller 108 may serve as a link between portions of the robotic device 100, such as a link between mechanical components 114 and/or electrical components 116. In some instances, the controller 108 may serve as an interface between the robotic device 100 and another computing device. Further, the controller 108 may serve as an interface between the robotic system 100 and a user(s). The controller 108 may include various components for communicating with the robotic device 100, including a joystick(s), buttons, among others. The controller 108 may perform other operations for the robotic device 100 as well. Other examples of controllers may exist as well.

Additionally, the robotic device 100 includes one or more sensor(s) 110 such as force sensors, proximity sensors, motion sensors, load sensors, position sensors, touch sensor, depth sensors, ultrasonic range sensors, and infrared sensors, among other possibilities. The sensor(s) 110 may provide sensor data to the processor(s) 102 to allow for appropriate interaction of the robotic system 100 with the environment as well as monitoring of operation of the systems of the robotic device 100. The sensor data may be used in evaluation of various factors for activation and deactivation of mechanical components 114 and electrical components 116 by controller 108 and/or a computing system of the robotic device 100.

The sensor(s) 110 may provide information indicative of the environment of the robotic device for the controller 108 and/or computing system to use to determine operations for the robotic device 100. For example, the sensor(s) 110 may capture data corresponding to the terrain of the environment or location of nearby objects, which may assist with environment recognition and navigation, etc. In an example configuration, the robotic device 100 may include a sensor system that may include a camera, RADAR, LIDAR, a global positioning system (GPS) transceiver, and/or other sensors for capturing information of the environment of the robotic device 100. The sensor(s) 110 may monitor the environment in real-time and detect obstacles, elements of the terrain, weather conditions, temperature, and/or other parameters of the environment for the robotic device 100.

Further, the robotic device 100 may include other sensor(s) 110 configured to receive information indicative of the state of the robotic device 100, including sensor(s) 110 that may monitor the state of the various components of the robotic device 100. The sensor(s) 110 may measure activity of systems of the robotic device 100 and receive information based on the operation of the various features of the robotic device 100, such the operation of extendable legs, arms, or other mechanical and/or electrical features of the robotic device 100. The sensor data provided by the sensors may enable the computing system of the robotic device 100 to determine errors in operation as well as monitor overall functioning of components of the robotic device 100.

For example, the computing system may use sensor data to determine the stability of the robotic device 100 during operations as well as measurements related to power levels, communication activities, components that require repair, among other information. As an example configuration, the robotic device 100 may include gyroscope(s), accelerometer(s), and/or other possible sensors to provide sensor data relating to the state of operation of the robotic device. Further, sensor(s) 110 may also monitor the current state of a function, such as a gait, that the robotic system 100 may currently be operating. Additionally, the sensor(s) 110 may measure a distance between a given robotic leg of a robotic device and a center of mass of the robotic device. Other example uses for the sensor(s) 110 may exist as well.

Additionally, the robotic device 100 may also include one or more power source(s) 112 configured to supply power to various components of the robotic device 100. Among possible power systems, the robotic device 100 may include a hydraulic system, electrical system, batteries, and/or other types of power systems. As an example illustration, the robotic device 100 may include one or more batteries configured to provide power to components via a wired and/or wireless connection. Within examples, components of the mechanical components 114 and electrical components 116 may each connect to a different power source or may be powered by the same power source. Components of the robotic system 100 may connect to multiple power sources as well.

Within example configurations, any type of power source may be used to power the robotic device 100, such as a gasoline engine. Further, the power source(s) 112 may charge using various types of charging, such as wired connections to an outside power source, wireless charging, combustion, or other examples. Other configurations may also be possible. Additionally, the robotic device 100 may include a hydraulic system configured to provide power to the mechanical components 114 using fluid power. Components of the robotic device 100 may operate based on hydraulic fluid being transmitted throughout the hydraulic system to various hydraulic motors and hydraulic cylinders, for example. The hydraulic system of the robotic device 100 may transfer a large amount of power through small tubes, flexible hoses, or other links between components of the robotic device 100. Other power sources may be included within the robotic device 100.

Mechanical components 114 represent hardware of the robotic system 100 that may enable the robotic device 100 to operate and perform physical functions. As a few examples, the robotic device 100 may include actuator(s), extendable leg(s) ("legs"), arm(s), wheel(s), one or multiple structured bodies for housing the computing system or other components, and/or other mechanical components. The mechanical components 114 may depend on the design of the robotic device 100 and may also be based on the functions and/or tasks the robotic device 100 may be configured to perform. As such, depending on the operation and functions of the robotic device 100, different mechanical components 114 may be available for the robotic device 100 to utilize. In some examples, the robotic device 100 may be configured to add and/or remove mechanical components 114, which may involve assistance from a user and/or other robotic device. For example, the robotic device 100 may be initially configured with four legs, but may altered by a user or the robotic device 100 to remove two of the four legs to operate as a biped. Other examples of mechanical components 114 may be included.

The electrical components 116 may include various components capable of processing, transferring, providing electrical charge or electric signals, for example. Among possible examples, the electrical components 116 may include electrical wires, circuitry, and/or wireless communication transmitters and receivers to enable operations of the robotic device 100. The electrical components 116 may interwork with the mechanical components 114 to enable the robotic device 100 to perform various operations. The electrical components 116 may be configured to provide power from the power source(s) 112 to the various mechanical components 114, for example. Further, the robotic device 100 may include electric motors. Other examples of electrical components 116 may exist as well.

In some implementations, the robotic device 100 may also include communication link(s) 118 configured to send and/or receive information. The communication link(s) 118 may transmit data indicating the state of the various components of the robotic device 100. For example, information read in by sensor(s) 110 may be transmitted via the communication link(s) 118 to a separate device. Other diagnostic information indicating the integrity or health of the power source(s) 112, mechanical components 114, electrical components 118, processor(s) 102, data storage 104, and/or controller 108 may be transmitted via the communication link(s) 118 to an external communication device.

In some implementations, the robotic device 100 may receive information at the communication link(s) 118 that is processed by the processor(s) 102. The received information may indicate data that is accessible by the processor(s) 102 during execution of the program instructions 106, for example. Further, the received information may change aspects of the controller 108 that may affect the behavior of the mechanical components 114 or the electrical components 116. In some cases, the received information indicates a query requesting a particular piece of information (e.g. the operational state of one or more of the components of the robotic device 100), and the processor(s) 102 may subsequently transmit that particular piece of information back out the communication link(s) 118.

In some cases, the communication link(s) 118 include a wired connection. The robotic device 100 may include one or more ports to interface the communication link(s) 118 to an external device. The communication link(s) 118 may include, in addition to or alternatively to the wired connection, a wireless connection. Some example wireless connections may utilize a cellular connection, such as CDMA, EVDO, GSM/GPRS, or 4G telecommunication, such as WiMAX or LTE. Alternatively or in addition, the wireless connection may utilize a Wi-Fi connection to transmit data to a wireless local area network (WLAN). In some implementations, the wireless connection may also communicate over an infrared link, Bluetooth, or a near-field communication (NFC) device.

Figure 2:
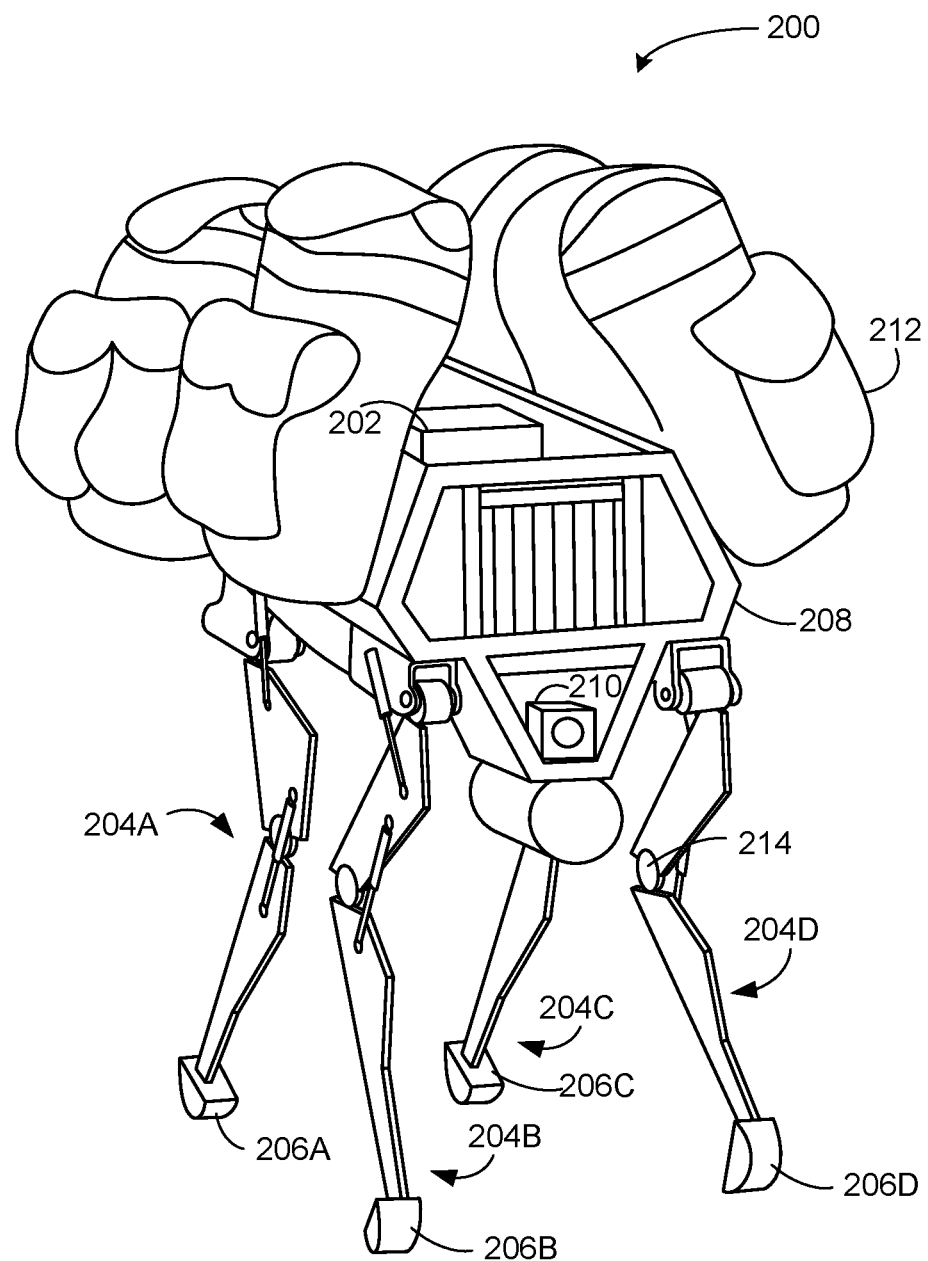
FIG. 2 illustrates a perspective view a quadruped robot, according to an example implementation.

FIG. 2 illustrates a perspective view of an example quadruped robot, according to an example implementation. Among other possible functions, the robotic device 200 may be configured to perform the procedures described herein during operation. The robotic device 200 includes legs 204A, 204B, 204C, and 204D connected to a body 208 of the robotic device 200 and may also include sensors configured to provide sensor data to a computing system of the robotic device 200. Each leg 204A, 204B, 204C, and 204D may include feet 206A, 206B, 206C, and 206D, respectively. Sensors may be incorporated within portions of the legs 204A, 204B, 204C, and 204D to detect pressure, position, velocity, acceleration, and orientation, among other measurements. Further, the robotic device 200 is illustrated carrying objects 212 on the body 208. Within other example implementations, the robotic device 200 may include more or fewer components and may additionally include components not shown in FIG. 2.

The robotic device 200 may be a physical representation of the robotic system 100 shown in FIG. 1 or may be based on other configurations. To operate, the robotic device 200 includes a computing system that be made up of one or multiple computing devices configured to assist in various operations of the robotic device 200. These operations may include processing data and providing outputs based on the data to cause various changes to the physical state of the robotic device 200. The computing system may process information provided by various systems of the robotic device 200 (e.g., a sensor system) or from other sources (e.g., a user, another robotic device, a server) and may provide instructions to these systems to operate in response.

Additionally, the computing system may monitor systems of the robotic device 200 during operation, which may include monitoring for errors and/or monitoring regular operation, for example. In some example configurations, the computing system may serve as a connection between the various systems of the robotic device 200, and may coordinate the operations of the systems together to enable the robotic device 200 to perform operations. Further, the computing system may include multiple devices, processors, controllers, and/or other entities configured to control or assist in the operation of the robotic device. Additionally, the computing system may operate using various types of memory and/or other components.

The robotic device 200 exists as a quadruped robotic device with four extendable legs 204A, 204B, 204C, and 204D. Although the robotic device 200 includes four legs 204A, 204B, 204C, and 204D in the illustration shown in FIG. 2, the robotic device 200 may include more or less legs within other examples. Further, the configuration, position, and/or structure of the legs 204A, 204B, 204C, and 204D may vary in example implementations. The legs 204A, 204B, 204C, and 204D enable the robotic device 200 to move and may be configured to operate in multiple degrees of freedom to enable different techniques of travel to be performed. In particular, the legs 204A, 204B, 204C, and 204D may enable the robotic device 200 to travel at various speeds through mechanically controlling the legs 204A, 204B, 204C, and 204D.

Each robotic leg 204A, 204B, 204C, and 204D may include joints, such at joint 214, and actuators. The joints allow members of a robotic leg to move through a range of angular degrees in a number of degrees of freedom. During operation, an actuator may be extended or compressed in order facilitate moving a robotic leg to various positions. Certain joints may have limited ranges of motion (e.g. −120 degrees to 120 degrees). Some combinations of joints and members may allow a robotic leg to move its lateral position, longitudinal position, and/or vertical position.

A gait is a pattern of movement of the limbs of animal, robotic device, or other mechanical structure. As such, the robotic device 200 may navigate by operating the legs 204A, 204B, 204C, and 204D to perform various gaits. The robotic device 200 may use a variety gaits to travel within an environment, which may involve selecting a gait based on speed, terrain, the need to maneuver, and/or energy efficiency. The robotic device 200 may be configured to dynamically switch between gaits, which may enable the robotic device to change speeds or the mechanics of operating the legs 204A, 204B, 204C, and 204D.

Further, different types of robotic devices may use different gaits due to differences in design (e.g. the number of legs of the robotic device) that may prevent use of certain gaits. Although some gaits may have specific names (e.g., walk, trot, run, gallop, and bound), the distinctions between these gaits may be slight. The gaits may be classified based on footfall patterns, the patterns including locations on a surface for the placement of distal ends of the extendable legs (e.g., feet). Similarly, gaits may also be classified based on mechanics.

Additionally, the robotic device 200 may include other mechanical apertures or appendages, which may be attached to the robotic device 200 at various positions. The robotic device 200 may include mechanical arms, grippers, wheels, or other features. The legs 204A, 204B, 204C, and 204D may have feet or other types of mechanical features (e.g. rubber feet to increase friction between the robotic device and a surface) that enables control upon various types of surfaces that the robotic device may encounter.

As part of the design of the example robotic device 200, the body 208 of the robotic device 200 connects to the legs 204A, 204B, 204C, and 204D and may house various components of the robotic device 200. As such, the structure of the body 208 may vary within examples and may further depend on particular operations that a given robotic device may have been designed to perform. For example, a robotic device developed to carry heavy loads may have a wide body that enables placement of the loads. Similarly, a robotic device designed to reach high speeds may have a narrow, small body that does not have substantial weight. Further, the body 208 as well as the legs 204A, 204B, 204C, and 204D may be developed using various types of materials, such as various metals or plastics. Within other examples, a robotic device may have a body with a different structure or made of other types of materials.

The sensor(s) 210 of the robotic device 200 may include various types of sensors. The sensor(s) 210 may be placed at various positions on the robotic device. As described for the robotic system 100, the robotic device 200 may include a sensory system that includes a camera, RADAR, LIDAR, a GPS transceiver, accelerometer(s), gyroscope(s), and/or other types of sensors. The sensor(s) may be configured to measure parameters of the environment of the robotic device 200 as well as monitor internal operations of systems of the robotic device 200. In some examples, the robotic device 200 may include sensors to measure the orientation, position, velocity, or acceleration of each leg 204A, 204B, 204C, and 204D.

In some implementations, sensor(s) 210 may be coupled to portions of the robotic legs 204A, 204B, 204C, and 204D. For instance, sensors may be configured to measure the angles of the joints of the robotic legs 204A, 204B, 204C, and 204D. In some implementations, the information or data output by the sensors may be provided to the control system 202. In some instances, inertial measurement units (IMUs) may be mounted to sections of the robotic legs 204A, 204B, 204C, and 204D in order to determine the orientation of each member the robotic legs 204A, 204B, 204C, and 204D. In addition, sensors, such as pressure transducers, may be coupled to the actuators of the robotic legs 204A, 204B, 204C, and 204D to measure the pressure inside the actuators and/or to measure the length that the actuator is extended or compressed. Other sensors may be included in addition to the previously mentioned sensors in order to measure aspects of the robotic device 200 from which angles of the joints of the robotic legs 204A, 204B, 204C, and 204D can be calculated.

In some implementations, the actuators of the robotic legs 204A, 204B, 204C, and 204D may be controlled to apply varying amounts of force. In some scenarios, a control system may control a particular robotic leg to apply a greater or lesser extent of force. Additionally, an amount of force being applied by a given robotic leg may be measured using sensors coupled to the robotic leg, such as a force sensor or a load cell.

The loads 212 carried by the robotic device 200 may represent various types of cargo that the robotic device 200 may transport. The loads 212 may also represent external batteries or other types of power sources (e.g., solar panels) that the robotic device 200 may utilize. The loads 212 represent an example use the robotic device 200 may be configured for. As such, the robotic device 200 may be configured to perform other operations as well.

Additionally, as shown with the robotic system 100, the robotic device 200 may also include various electrical components that may enable operation and communication between the mechanical features of the robotic device 200. As previously indicated, the robotic device 200 may include one or more computing systems that include one or multiple processors configured to perform various functions, including processing inputs to provide outputs. The computing system may include additional components, such as various types of storage and a power source, etc.

Control system 202 of robotic device 200 may cause the robotic device 200 to navigate an environment based on sensor data from the sensing system. The sensing system may include sensors of sensing system coupled to portions of the robotic device 200. The robotic device 200 may receive navigation commands by way of a communication system. For instance, the robotic device may receive a command to move forward at 5 kilometers per hour. The command may specify to walk forward for a particular distance, such as 100 meters. In an example, a command may specify one or more locations at which to place particular legs.

In some examples, the navigation commands may involve GPS coordinates. In some instances, a command may instruct the robotic device to navigate to a particular position, which may be defined by particular GPS coordinates. The robotic device may then cause the locomotion system to move to the position while navigating physical features of the terrain identified by the control system (perhaps based on data from perception sensors). Another command may instruct the robotic device to follow a particular person, who may have with them a GPS enabled device that generates data indicating the position of the person. The data may be communicated to the robotic device that may then cause the locomotion system to follow the person while navigating physical features of the terrain identified by the control system.

In some example implementations, during operation, the computing system may communicate with other systems of the robotic device 200 via wired or wireless connections and may further be configured to communicate with one or multiple users of the robotic device. As one possible illustration, the computing system may receive an input from a user indicating that the user wants the robotic device to perform a particular gait in a given direction. The computing system may process the input, and may cause the systems of the robotic device to perform the requested gait. Additionally, the robotic device's electrical components may include other type of electrical components, including but not limited to interface, wires, busses, and/or other communication links configured to enable systems of the robotic device to communicate.

Furthermore, the robotic device 200 may communicate with one or multiple users and/or other robotic devices via various types of interfaces. In an example implementation, the robotic device 200 may receive input from a user via a joystick or similar type of interface. The computing system may be configured to receive data indicative of the amount of force, the duration of force applied to the joystick, and other possible information, from a joystick interface. Similarly, the robotic device 200 may receive inputs and communicate with a user via other types of interface, such as a mobile device or a microphone. Regardless, the computing system of the robotic device 200 may be configured to process the various types of inputs that the robotic device 200 may receive.

Figure 3:
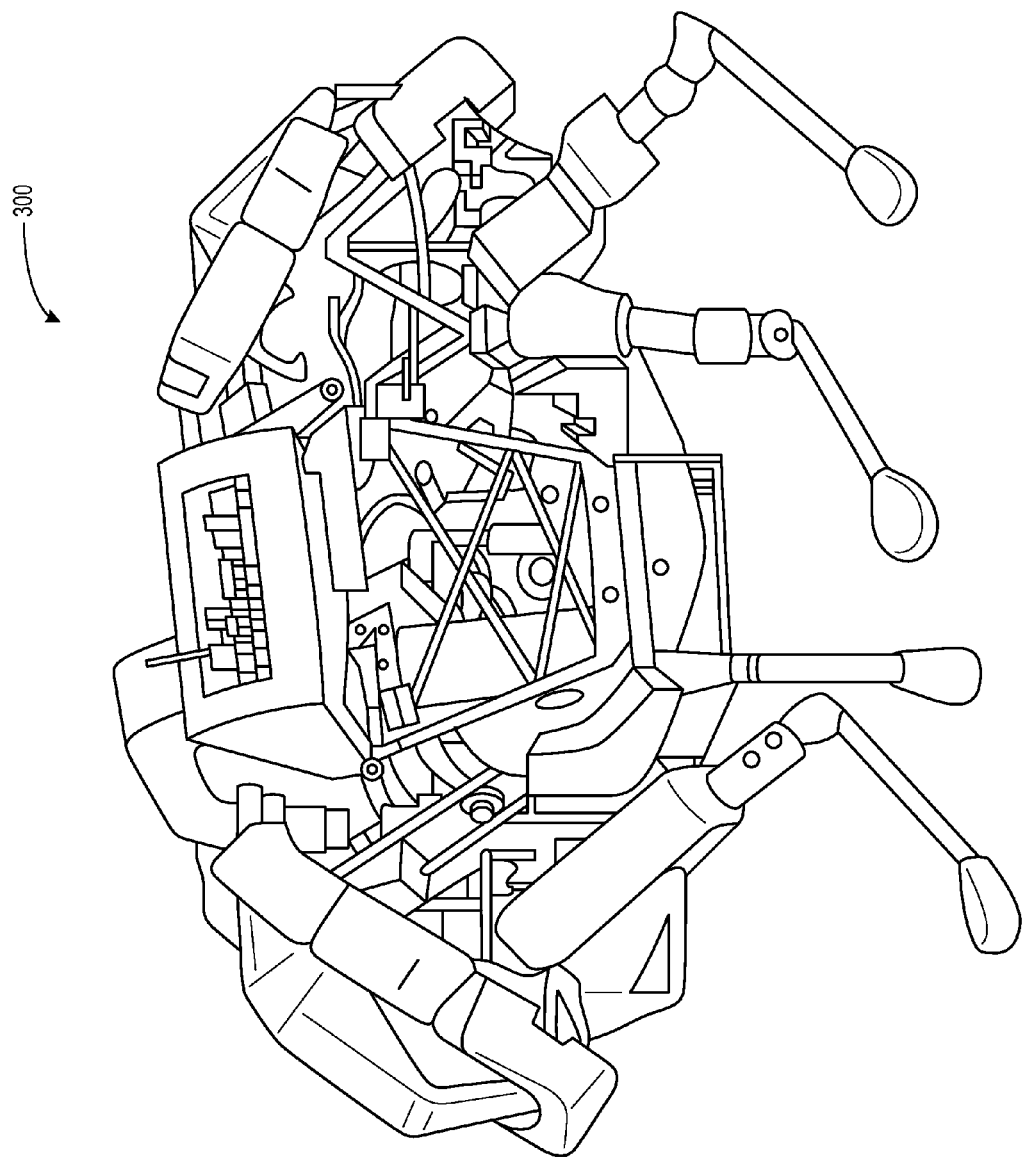
FIG. 3 illustrates a perspective view a quadruped robot, according to an example implementation.

FIG. 3 illustrates another example quadruped robot, according to an example implementation. Similarly to robotic device 200 shown in FIG. 2, the robotic device 300 may correspond to the robotic system 100 shown in FIG. 1. The robotic device 300 serves as another possible implementation of a robotic device that may be configured to estimate the robotic device's orientation, yaw, pitch, and/or roll. Other example implementations of robotic devices may exist.

Figure 4:
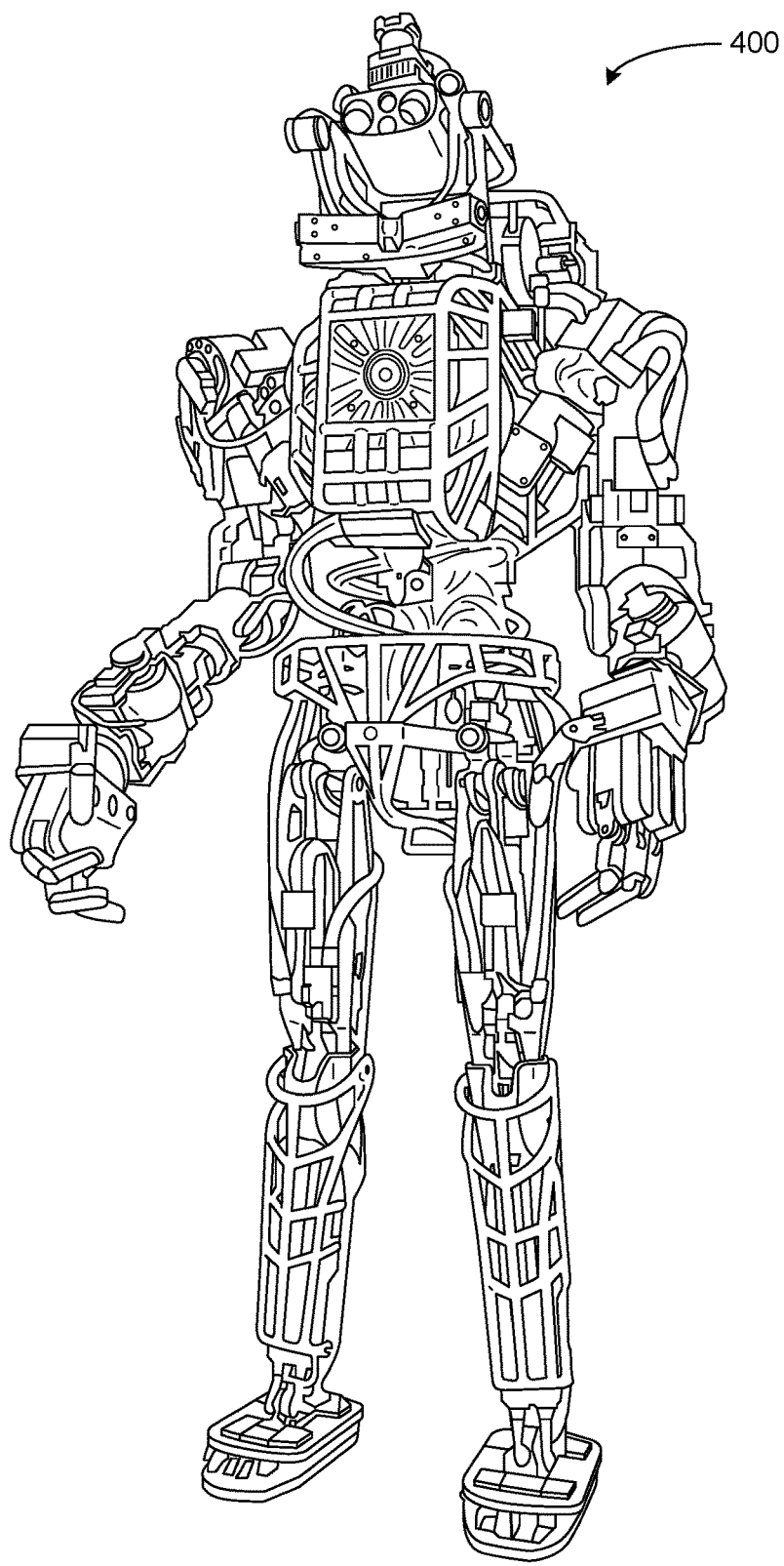
FIG. 4 illustrates a perspective view a biped robot, according to an example implementation.

FIG. 4 illustrates an example of a biped robot according to another example implementation. Similarly to the robotic device 400 shown in FIG. 2, the robotic device 400 may correspond to the robotic system 100 shown in FIG. 1. The robotic device 400 serves as a possible implementation of a robotic device that may be configured to estimate the robotic device's orientation, yaw, pitch, and/or roll. Other example implementations of robotic devices may exist.

The robotic device 400 may include a number of articulated appendages, such as robotic legs and/or robotic arms. Each articulated appendage may include a number of members connected by joints that allow the articulated appendage to move through certain degrees of freedom. Each member of an articulated appendage may have properties describing aspects of the member, such as its weight, weight distribution, length, and/or shape, among other properties. Similarly, each joint connecting the members of an articulated appendage may have known properties, such as the degrees of its range of motion the joint allows, the size of the joint, and the distance between members connected by the joint, among other properties. A given joint may be a joint allowing one degree of freedom (e.g. a knuckle joint or a hinge joint), a joint allowing two degrees of freedom (e.g. a cylindrical joint), a joint allowing three degrees of freedom (e.g. a ball and socket joint), or a joint allowing four or more degrees of freedom. A degree of freedom may refer to the ability of a member connected to a joint to move about a particular translational or rotational axis.

The robotic device 400 may also include sensors to measure the angles of the joints of its articulated appendages. In addition, the articulated appendages may include a number of actuators that can be controlled to extend and retract members of the articulated appendages. In some cases, the angle of a joint may be determined based on the extent of protrusion or retraction of a given actuator. In some instances, the joint angles may be inferred from position data of inertial measurement units (IMUs) mounted on the members of an articulated appendage. In some implementations, the joint angles may be measured using rotary position sensors, such as rotary encoders. In other implementations, the joint angles may be measured using optical reflection techniques. Other joint angle measurement techniques may also be used.

The robotic device 400 may be configured to send sensor data from the articulated appendages to a device coupled to the robotic device 400 such as a processing system, a computing system, or a control system. The robotic device 400 may include a memory, either included in a device on the robotic device 400 or as a standalone component, on which sensor data is stored. In some implementations, the sensor data is retained in the memory for a certain amount of time. In some cases, the stored sensor data may be processed or otherwise transformed for use by a control system on the robotic device 400. In some cases, the robotic device 400 may also transmit the sensor data over a wired or wireless connection to an external device.

III. Example Scenarios

Figure 5A:
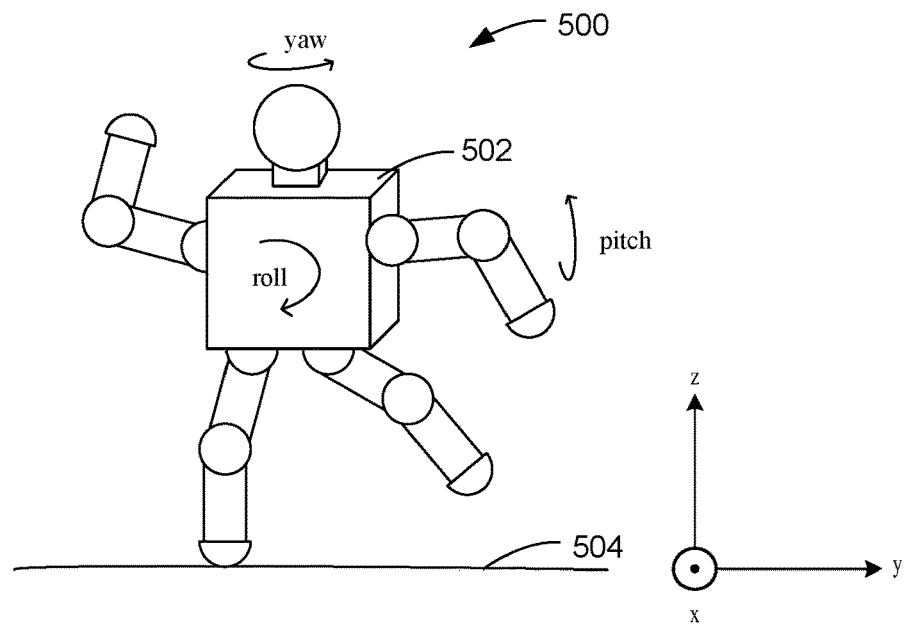
FIG. 5A illustrates a stance of a biped robot, according to an example implementation.
Figure 5B:
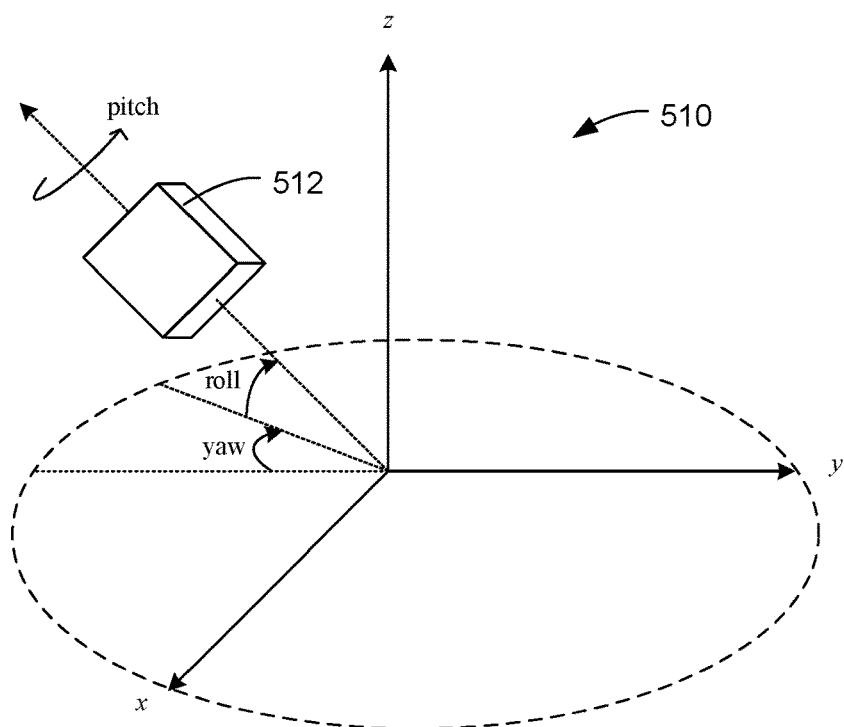
FIG. 5B illustrates a simplified representation of a biped robot, according to an example implementation.
Figure 5C:
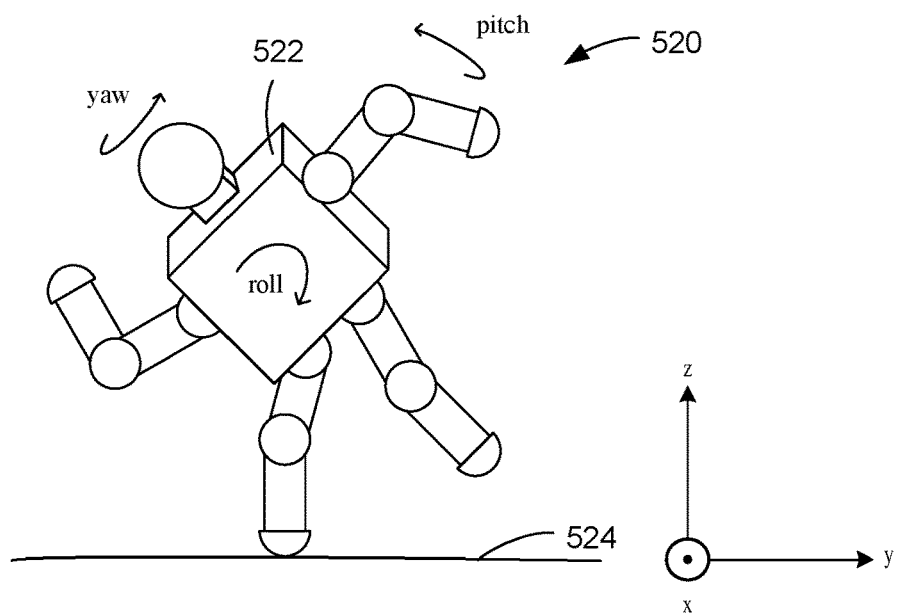
FIG. 5C illustrates a stance of a biped robot, according to an example implementation.
Figure 5D:
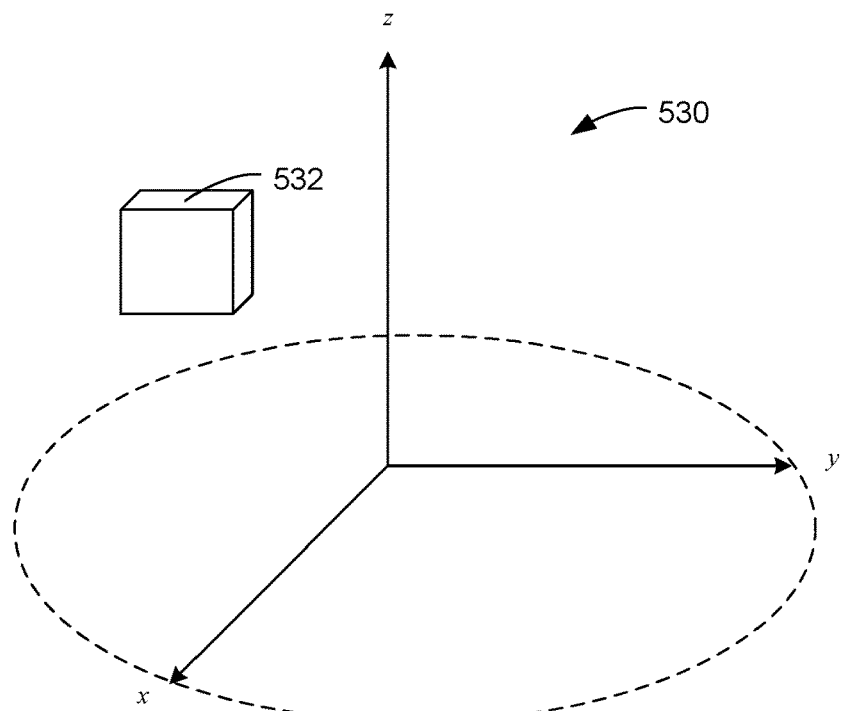
FIG. 5D illustrates a simplified representation of a biped robot, according to an example implementation.

FIGS. 5A and 5C illustrate stances of an example biped robot. The biped robot shown in FIGS. 5A and 5C may the same as or similar the robotic device 400 depicted in FIG. 4, the robotic device 300 depicted in FIG. 3, or the robotic device 200 depicted in FIG. 2. FIGS. 5B and 5D depict simplified representations of the biped robot in FIGS. 5A and 5C, respectively. The simplified representations shown in FIGS. 5B and 5D are rigid body estimations of the biped robot's aggregate orientation from FIGS. 5A and 5C, respectively. The biped robot depicted in FIGS. 5A and 5C and the simplified representations of the biped robot depicted in FIGS. 5B and 5D are shown for illustrative purposes and may not necessarily be drawn to scale. Similarly, the specific angles and locations depicted in FIGS. 5B and 5D are not drawn to scale and do not necessarily represent accurate representations of the biped robot's aggregate orientation.

FIGS. 5A and 5C illustrate axes representing the direction of the x-, y-, and z-axes. The axes designated as such for the purposes of explanation, and may be represented differently in various implementations. The circle with the dot in its center represents the x-axis pointing out of the front of the illustrations. FIGS. 5B and 5D illustrate a three-dimensional representations of axes that also have particular designations for the x-, y-, and z-axes. The axes in FIGS. 5B and 5D may be designated in other ways in various implementations.

FIGS. 5A, 5B, 5C, and 5D include arrows depicting an amount of yaw rotation, pitch rotation, and roll rotation. The rotation amounts may be represented as degrees or radians. In FIGS. 5A and 5C, these arrows represent the amount of yaw rotation, pitch rotation, and roll rotation measured from sensors coupled to the base (i.e. the main body) of the biped robot (i.e. orientation of the base of the biped robot). In FIGS. 5B and 5D, the yaw, pitch, and roll arrows represent the aggregate amount of yaw rotation, pitch rotation, and roll rotation estimated by a processing system of the biped robot based on the orientation of the biped robot's base and the angles of the biped robot's joints.

The arrows depicted in FIGS. 5A and 5C do not necessarily imply that there is an amount of yaw rotation, pitch rotation, or roll rotation. For example, the amount of roll rotation of the biped robot in FIG. 5A may be zero degrees. The arrows are depicted for explanatory purposes, and the amount of yaw, pitch, and roll rotation may be specified within particular sections of this application.

Although the biped robot in FIGS. 5A and 5C are depicted with four robotic limbs (two articulated legs and two articulated arms), the aggregate orientation and/or angular velocity of any other robotic device having any number of limbs may be estimated in accordance with operations of the present application. For example, the aggregate orientation and/or angular velocity may be determined for robotic device 200 illustrated in FIG. 2 and for the robotic device 300 illustrated in FIG. 3, among other robotic devices.

FIG. 5A illustrates a stance 500 of a biped robot 502, according to an example implementation. The biped robot 502 is standing on surface 504 with one leg. The biped robot 502 may be similar to robotic device 400 shown in FIG. 4, and may also include one or more components of robotic device 100 in FIG. 1. The body of the biped robot 502 is depicted as being parallel with surface 504, such that sensors coupled to the body of the biped robot 502 might indicate the roll angle of the body to be zero.

The limbs of the biped robot 502 are extended such that a torque is applied to the biped robot 502. Although the biped robot 502 is depicted as being upright, the biped robot 502 depicted in FIG. 5A would fall to the right if no balance control was applied to move the limbs. Despite the biped robot 502 being in an unstable stance, a control system that receives information from sensors coupled to the body of the biped robot 502 may determine that no control is required to maintain the biped robot's balance. In some cases, a control system may react to angular velocity sensed after the biped robot begins to fall; however, reacting to changes in angular velocity may result in the control system providing drastic control measures to maintain the biped robot's balance. Thus, controlling the biped robot on the basis of changes to angular velocity is reactive, and may cause a control system to provide an otherwise unnecessary amount of control effort.

The biped robot 502 may include a processing system thereon that is configured to estimate an aggregate orientation of the biped robot 502. The processing system may also calculate the rate of change of the aggregate orientation of the biped robot 502 to determine the angular velocity and/or the angular momentum of the biped robot 502. In some implementations, the processing system estimates the aggregate orientation of the biped robot 502 based on the angles of the joints of the biped robot's limbs and the measured orientation of the body of the biped robot 502. The aggregate orientation, angular velocity, and/or angular momentum of the biped robot 502 may be provided as inputs to a control system coupled to the biped robot. The control system may be configured to operate the biped robot with a particular behavior (i.e. stationary balancing, walking, running, etc.).

The processing system may include a memory that stores a relationship between the joint angles of the robotic device and the extent to which the joint angles of the robotic device affect the orientation and/or angular velocity of the base of the robotic device. Each limb of the biped robot 502 includes members and joints, allowing the limbs to be positioned in a variety of ways. As previously described, the positioning of the limbs may be achieved through actuation of actuators coupled to members of the limbs of the biped robot 502. As a given limb moves through its range of motion, the limb's center of mass may be positioned at a variety of locations having varying distances from the center of mass of the body of the biped robot 502. The mass of a limb of the biped robot 502 extended away from the biped robot's body may introduce a torque on the body of the biped robot 502 as a result of a gravitational force on the extended limb. Thus, based on the kinematics and mass properties of the various portions of the biped robot 502, a relationship between the joint angles and the motion of the body of the biped robot 502 may be determined. The processing system may then apply the effects of the joint angles to the measured orientation of the body of the biped robot 502 to determine the biped robot's aggregate orientation.

In some implementations, the processing system performs a time differentiation on the aggregate orientation in order to estimate the biped robot's angular velocity. The processing system may also determined an estimated angular momentum of the biped robot 502 based on the estimated angular velocity.

In some implementations, the angular velocity and/or the angular momentum may be used to predict the aggregate orientation of the biped robot 502 at a future time. Thus, a control system may proactively provide balance control before the body of the biped robot 502 is moving at a significant angular velocity. By anticipating the aggregate orientation of the biped robot 502 before the biped robot 502 rotates to that orientation, unstable orientations may be preemptively identified, greatly reducing the extent of control effort required to balance the biped robot 502 compared to a reactive control system.

As an example, a quadruped robot such as robotic device 200 in FIG. 2 or robotic device 300 in FIG. 3 may be travelling at a great enough velocity that no legs are in contact with the ground at certain times. In these cases, predicting the aggregate orientation of the quadruped robot while in the quadruped robot is in mid-air may be useful in determining how to orient the front legs of the quadruped robot before making contact with the ground.

In some instances, a robotic device may include a flexible member coupled to the body of the robotic device that allows the body to bend and/or rotate. Sensors may measure the angle of the rotating sections of the flexible member and provide the angle measurements as input to the processing system. The processing system may consider those angle measurements, along with other angle measurements and a measurement of the orientation of a portion of the body in determining the aggregate orientation of the robotic device.

The body of the biped robot 502 depicted in FIG. 5A has a yaw angle of zero degrees, a pitch angle of zero degrees, and a roll angle of zero degrees. However, the limbs of the biped robot 502 are oriented such that the biped robot is unstable. Thus, as time progresses, the biped robot 502 would tip over if no balance control was provided to the limbs.

FIG. 5B illustrates a simplified representation 510 of biped robot 502 shown in FIG. 5A. The processing system of biped robot 502 may receive the zero degree measurements of the yaw, pitch, and roll angles, along with the angles of the joints of the biped robot 502. The processing system may then determine the aggregate orientation of the biped robot 502. Although the yaw, pitch, and roll angles of the body of the biped robot 502 were zero degrees, the aggregate orientation of the biped robot 502 may have non-zero values.

In FIG. 5B, the simplified representation 512 of the biped robot 502 has non-zero yaw, pitch, and roll angles. The simplified representation 512 of the biped robot 502 is oriented with respect to a reference frame 510, which may be a surface or the ground. In some implementations, at least one of the non-zero yaw, pitch, and roll angles may indicate instability in the balance of the biped robot 502. For instance, a non-zero roll angle may, in some cases, be indicative of a torque applied to the body of the biped robot 502 resulting from one or more limbs being extended to one side of the biped robot 502. Thus, despite the body of the biped robot 502 being parallel with the surface 504, the aggregate orientation indicates instability that would increase the angular velocity of the biped robot 502 over time.

The estimated aggregate orientation may be provided to a control system of the biped robot 502, which may subsequently control at least one of the limbs of the biped robot 502 to balance the biped robot 502. For instance, the lifted leg of the biped robot 502 in FIG. 5A may be placed on the ground, thereby changing the angle of one or more joints of the lifted leg. As the joint angles in leg change to indicate that the leg is extended to make contact with the surface 504, the aggregate orientation estimated by the processing system may indicate that the biped robot 502 is becoming more stable. For instance, the changing joint angles caused by extending the leg to touch the surface 504 may decrease the aggregate roll angle.

In some cases, the control system of the biped robot 502 is configured to maintain the translational velocity of the biped robot 502 at particular pace (e.g. walking pace or a running pace).

In an example implementation, a robotic device may have a relationship that correlates the positions of its joint angles with the aggregate orientation of the robotic device. The robotic device may have two legs and one arm, where the one arm has one joint connecting a member attached to the robotic device's body to another member. The relationship may dictate that, when the joint has an angle that is between 0 and 90 degrees, the arm does not introduce enough torque to cause the robot to tip over. The relationship may also dictate that, when the joint has an angle between 90 and 180 degrees, the arm produces enough torque on the robotic device's body, causing the robotic device to angularly accelerate and eventually tip over. Any combination of joint angle ranges may be correlated to a torque produced on the body of the robotic device in various implementations.

In some cases, a robotic device may be running and thus does not have any contact with the ground at certain points in time. The robotic device's body may oscillate while running, such that a control device considering only the orientation measurement of the robotic device's body may, at certain points in time, determine that the robotic device is unstable and thus requires a control effort to maintain balance. However, a relationship between the joint angles of the legs of the robotic device and the orientation of the body of the robotic device may indicate that the aggregate orientation of the robotic device has a far less severe oscillation compared to the body orientation of the robotic device. In these cases, a control system of the present disclosure reduces unnecessary control effort that may otherwise have been exerted.

FIG. 5C illustrates a stance 520 of a biped robot 522, according to an example implementation. Similarly to biped robot 502, biped robot 522 is standing on surface 524 with one leg. However, the body of the biped robot 522 is depicted as being tilted, such that sensors coupled to the body of the biped robot 522 might indicate the roll angle of the body to be non-zero. The biped robot 522 may be the same as or similar to robotic device 400 shown in FIG. 4, and may also include one or more components of robotic device 100 in FIG. 1.

The limbs of biped robot 522 are extended such that the biped robot 522 is balanced. Unlike the biped robot 502 in FIG. 5A, the biped robot 522 is stable and does not require control of the limbs to maintain balance. The limbs of the biped robot 522 are extended in such a way that no torque is applied on the body of the biped robot 522.

Similarly to the biped robot 502, the biped robot 522 may include a processing system thereon that is configured to estimate an aggregate orientation of the biped robot 522. The processing system may receive the angles of the joints of the biped robot 522 and the measured orientation of the body to determine the biped robot's aggregate orientation. In the example stance 520 depicted in FIG. 5C, although the body orientation is indicative of an unstable stance requiring control to maintain balance of the biped robot 522, the processing system determines from the aggregate orientation that the biped robot 522 is stable. The processing system may also perform a time differentiation of the aggregate orientation and determine that the angular velocity of the biped robot 522 is not changing.

The body of the biped robot 522 in FIG. 5C has a yaw angle of zero degrees, a pitch angle of zero degrees, and a non-zero roll angle. However, the aggregate orientation of the biped robot—which is depicted in the simplified representation of the biped robot 522 in FIG. 5D—may be determined to have a roll angle of zero.

FIG. 5D illustrates a simplified representation 532 of a biped robot 522, according to an example implementation. The simplified representation 532 of the biped robot 502 is oriented with respect to a reference frame 530, which may be a surface or the ground. The processing system of the biped robot 522 may receive measurements of the orientation of the body of the biped robot 522 indicating zero-degree yaw and pitch angles and a non-zero roll angle. The processing system of the biped robot 522 may also receive measurements of the angles of the joints of the biped robot 522. Then, the processing system may estimate the aggregate orientation of the biped robot 522 in the same or similar manner as previously described. Although the received roll angle of the biped robot's body is non-zero, the aggregate orientation of the biped robot 522 indicates that the biped robot 522 has a zero degree roll angle.

The estimated aggregate orientation may be provided to a control system of the biped robot 522. The control system may determine that the biped robot 522 is stable and does not require control to maintain balance of the biped robot 522.

In some instances, the aggregate orientation may indicate that the aggregate roll angle of the biped robot 522 is a very small non-zero amount. As a result, the processing system may predict that the aggregate orientation of the biped robot 522 is accelerating about the roll axis. In these instances, the control system may control the limbs of the biped robot 522 to maintain balance of the biped robot 522. In some implementations, the control system may vary the force applied to the ground by the leg of the biped robot 522 in order to maintain balance.

In some instances, the processing system determines a path that indicates an expected trajectory of the robot based on the estimated aggregate orientation, among other measurements (e.g. the velocity and direction of the velocity of the robotic device). This may involve computing the expected locations of the robotic device based on its estimated aggregate orientation for a threshold amount of time. For example, the determined path may indicate the expected trajectory for a one minute period of time in the future.

The processing system may also determine whether an object is present within the determined path. This may involve the processing system receiving images from an image-capture system coupled to the robotic device and performing object detection techniques to identify any possible objects. In some cases, an object may be detected if it is above a certain threshold size.

When an object is detected along the expected path, the processing system may modify or otherwise alter the path of the robot so that its trajectory avoids a collision with the object. The processing system may accomplish this by providing instructions to change the orientation and/or velocity (in the x-direction, y-direction, and/or z-direction) of the robotic device. In some cases, the processing system may calculate the expected trajectory of the robotic device to ensure that the robotic device avoids colliding with the detected object.

In some cases, when an object is detected along the expected path, the processing system may provide instructions to the robotic device to stop the robotic device from hitting the object.

In some implementations, the processing system may receive a desired trajectory for the robotic device to travel along. The processing system may then, based on the desired trajectory and the estimated aggregate orientation of the robotic device, determine a manner in which to operate the robotic device that causes it to travel along this desired trajectory. This may include providing instructions to modify the robotic device's orientation and/or velocity (in the x-direction, y-direction, and/or the z-direction).

IV. Example Methods

Figure 6:
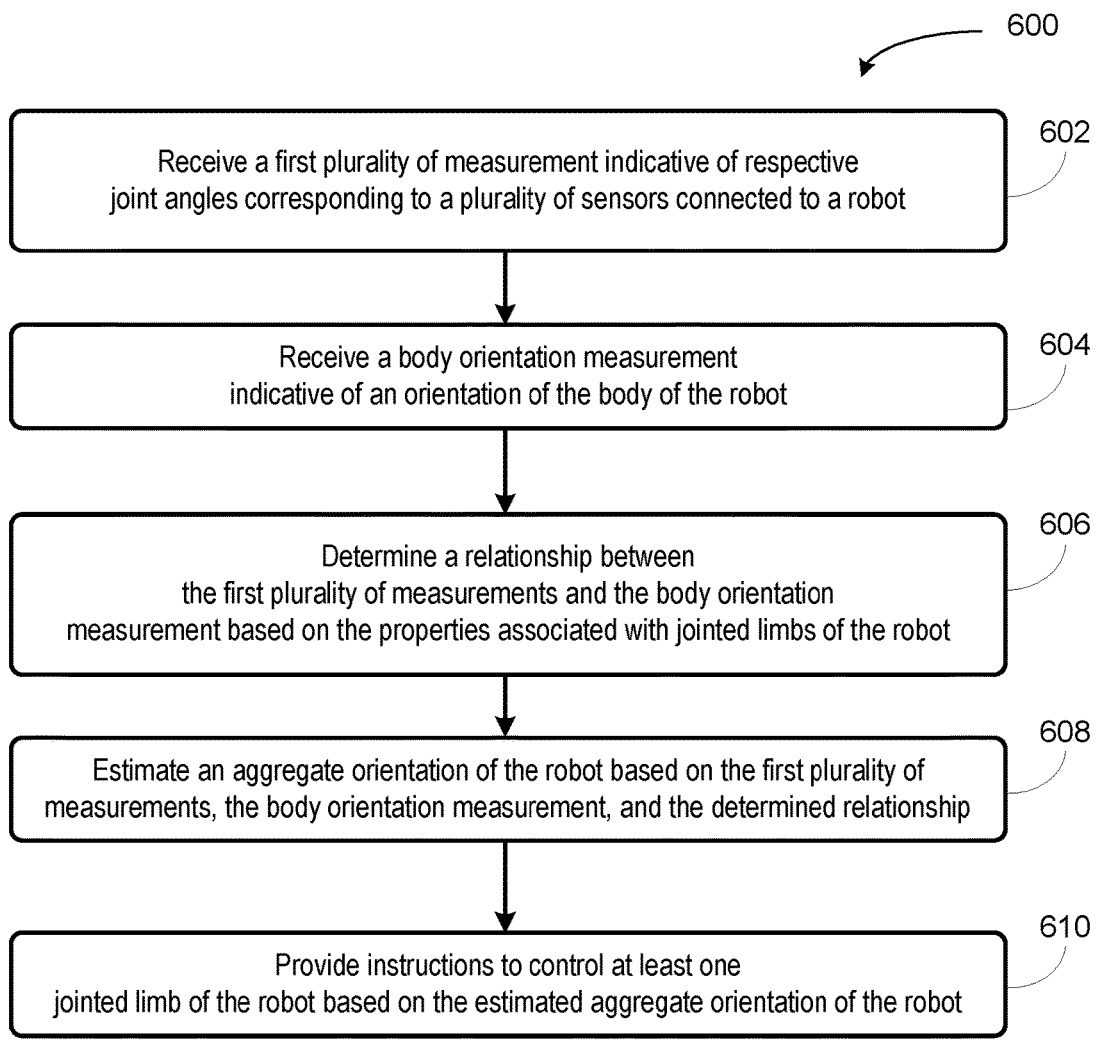
FIG. 6 is a flowchart, according to an example implementation.

FIG. 6 is a flowchart 600, according to an example implementation. The operations in the flowchart could, for example, be performed by the robotic device 100 in FIG. 1, the robotic device 200 in FIG. 2, the robotic device 300 in FIG. 3, the robotic device 400 in FIG. 4, or any combination of components from robotic device 100, robotic device 200, robotic device 300, and/or robotic device 400. FIG. 6 may include one or more operations, or procedures as illustrated by one or more of blocks 602, 604, 606, 608, and 610. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for FIG. 6 and other procedures and operations described herein, the flowchart shows the functionality and operation of one possible implementation of present implementations. In this regard, each block may represent a module, a segment, or a portion of program code, which includes one or more instructions executable by a processor for implementing specific logical operations or steps in this process. In addition, each block may represent a portion of program code that performs and/or modifies an operation of a robotic device. The program code may be stored on any type of computer-readable medium, for example, such as a storage device including a disk or hard drive. The computer-readable medium may include a non-transitory computer-readable medium, for example, such as computer-readable media that stores data for short periods of time like register memory, processor cache and random access memory (RAM). The computer-readable medium may also include other non-transitory media, such as secondary or persistent long term storage, like read only memory (ROM), optical or magnetic disks, compact-disc read only memory (CD-ROM), for example. The computer-readable media may also be any other volatile or non-volatile storage system. The computer-readable medium may be considered a computer-readable storage medium, a tangible storage device, or other article of manufacture, for example. The program code (or data for the code) may also be stored or provided on other media including communication media. For instance, the commands may be received on a wireless communication media.

Further, for FIG. 6 and other procedures and operations described herein, each block may represent circuitry that is arranged to perform the specific logical operations.

Operations of FIG. 6 may be fully performed by a control device or by the processor, or may be distributed across multiple control devices. In some examples, the control device may receive information from sensors of a robotic device, or the control device may receive the information from a processor that collects the information. The control system might further communicate with a remote control system (e.g., a control device on another robotic device) to receive information from sensors of other devices, for example. For the purposes of explanation, the operations of blocks 602, 604, 606, 608, and 610 are described as being performed by a control device; however, other devices as described above may carry out the operations.

At block 602, a processing system receives a first plurality of measurements indicative of respective joint angles corresponding to a plurality of sensors connected to a robot. In some cases, the joint angle measurements received may be analog electrical signals representing the joint angles. In some implementations, the sensors include circuitry to convert the analog electrical signals to digital electrical signals representing the joint angles. In some cases, a given sensor may detect relative changes in the joint angle, and the processing system may keep track of the position of the joints by measuring the changes in the joint angle over time. The joint angles may be represented in degrees or in radians, depending on the particular implementation. The sensors may transmit the joint angles to the processing system via a wired connection or a wireless connection.

At block 604, the processing system receives an orientation measurement indicative of an orientation of the body of the robot. The orientation of the body of the robotic device may be measured by one or more sensors, such as accelerometers, gyroscopes, magnetometers, and/or inertial measurement units (IMUs), among other sensors. The sensors may measure acceleration of the body of the robotic device and/or rotational angles such as pitch, roll, and yaw of the body of the robot. The sensors may provide the acceleration and/or rotational angles to the processing system, and the processing system may determine at least one of the velocity, position, orientation, and the angular velocity of the body of the robot. In some implementations, the sensors may include thereon circuitry to determine at least one of the velocity, position, orientation and/or angular velocity of the body of the robot, and may then provide those measurements to the processing system.

The body of the robotic device may be any portion of the robotic device to which robotic limbs are connected. In some implementations, the robotic limbs are connected to the body of the robotic device through rotatable joints.

At block 606, the processing system determines a relationship between the first plurality of measurements and the orientation measurement based on the properties associated with the jointed limbs of the robot. The relationship may be the same as or similar to relationships previously described. The relationship may be stored on a memory coupled to the robot. The robotic device may include a computing device that is configured to execute program instructions stored on the memory. In some implementations, the relationship may be integrated into the program instructions.

The relationship may be a mathematical formula or algorithm that can be used to determine the robot's aggregate orientation from the orientation measurement and joint angle measurements. The processing system and/or computing device of the robotic device may perform the calculation of the mathematical formula or execute the algorithm in order to determine the robot's aggregate orientation. In some instances, this relationship may be integrated as a part of a control system implemented on a control device, such as a field-programmable gate array (FPGA).

In some implementations the relationship may be updated or otherwise modified. In some cases, instructions to update or modify the relationship may be received at a communication link of the robot. As previously described, multiple relationships may be used to determine the aggregate orientation of the robot, and the robotic device may receive instructions to add, remove, update, or modify one or more these relationships.

At block 608, the processing system estimates an orientation of the robotic device based on the first plurality of measurements, the orientation measurement, and the determined relationship. The estimated orientation of the robotic device may be the same as or similar to the aggregate orientation of the robotic device as previously described. The estimated orientation may be determined by performing mathematical or algorithmic operations on the first plurality of measurements and the orientation measurements in accordance with the received relationship.

The estimated orientation may be stored on a memory of the robot. In some implementations, the estimated orientation is transmitted to an external computing device either over a wired connection or a wireless connection. Further, in some instances, the estimated orientation may be provided to other devices or systems of the robot, such as a control system.

At block 610, the processing system provides instructions to control at least one jointed limb of the robotic device based on the estimated orientation of the robot. The instructions may correspond to maneuvering one or more of the limbs of the robot. For example, an instruction may cause a limb of the robotic device to move to a specific location and have a specific orientation. An instruction may also specify the manner in which to move the limb (e.g. how quickly the move the limb to the specific location). An instruction may further specify the amount of force that a particular limb applied to the ground or other surface.

In some implementations, the instructions are analog signals that control actuators on the limbs of the robot. In some cases, the actuators may be configured to receive digital signals, and the instructions may be digital signals provided to one or more actuators to control the limbs of the robot.

V. Example Computer-Readable Medium

Figure 7:
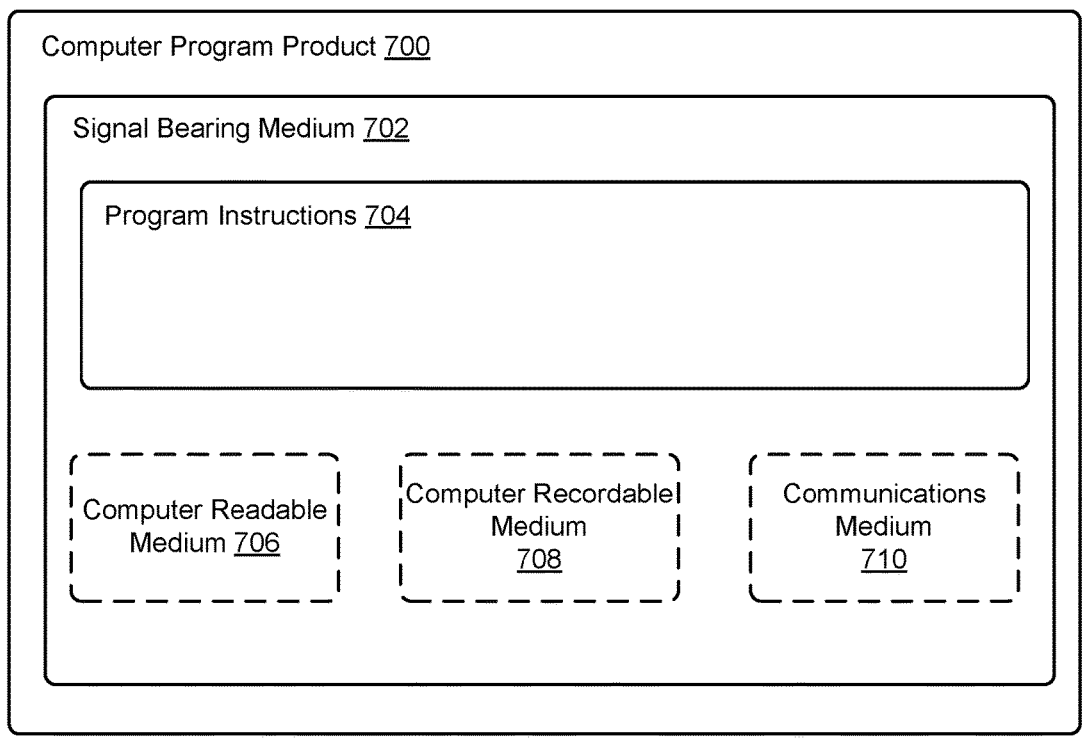
FIG. 7 is a computer-readable medium configured according to an example implementation.

FIG. 7 illustrates an example computer-readable medium configured according to at least some implementation described herein. In example implementations, the example system can include one or more processors, one or more forms of memory, one or more input devices/interfaces, one or more output devices/interfaces, and machine readable instructions that when executed by the one or more processors cause a robotic device to carry out the various functions tasks, capabilities, etc., described above.

As noted above, the disclosed procedures can be implemented by computer program instructions encoded on a computer-readable storage medium in a machine-readable format, or on other media or articles of manufacture. FIG. 7 is a schematic illustrating a conceptual partial view of a computer program product that includes a computer program for executing a computer process on a computing device, arranged according to at least some implementations disclosed herein.

In an implementation, the example computer program product 700 is provided using a signal bearing medium 702. The signal bearing medium 702 may include one or more program instructions 704 that, when executed by one or more processors may provide functionality or portions of the functionality described above with respect to FIGS. 1-6. In some examples, the signal bearing medium 702 can be a computer-readable medium 706, such as, but not limited to, a hard disk drive, a Compact Disc (CD), a Digital Video Disk (DVD), a digital tape, memory, etc. In some implementations, the signal bearing medium 702 can be a computer recordable medium 708, such as, but not limited to, memory, read/write (R/W) CDs, R/W DVDs, etc. In some implementations, the signal bearing medium 702 can be a communication mediums 710 (e.g., a fiber optic cable, a waveguide, a wired communications link, etc.). Thus, for example, the signal bearing medium 702 can be conveyed by a wireless form of the communications medium 710.

The one or more program instructions 704 can be, for example, computer executable and/or logic implemented instructions. In some examples, a computing device is configured to provide various operations, functions, or actions in response to the program instructions 704 conveyed to the computing device by the computer readable medium 706, the computer recordable medium 708, and/or the communications medium 710. In other examples, the computing device can be an external device in communication with a device coupled to the robotic device.

The computer readable medium 706 can also be distributed among multiple data storage elements, which could be remotely located from each other. The computing device that executes some or all of the stored instructions could be an external computer, or a mobile computing platform, such as a smartphone, tablet device, personal computer, or a wearable device, among others. Alternatively, the computing device that executes some or all of the stored instructions could be a remotely located computer system, such as a server. For example, the computer program product 700 can implement operations discussed in reference to FIG. 6.

VI. Conclusion

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. It is also to be understood that the terminology used herein is for the purpose of describing particular implementations only, and is not intended to be limiting.

What is claimed is:

1. A method comprising:
   receiving, from a plurality of sensors connected to a robot, a plurality of measurements indicative of respective joint angles of jointed limbs connected to a body of the robot;
   receiving a body orientation measurement indicative of an orientation of the body of the robot;
   estimating an aggregate orientation of the robot based on the plurality of measurements and the body orientation measurement;
   determining that the estimated aggregate orientation is unstable based on a particular angle of the estimated aggregate orientation having more than a non-zero threshold value, wherein the particular angle is one of a yaw angle, a pitch angle, or a roll angle; and
   in response to determining that the estimated aggregate orientation is unstable, providing instructions to control at least one of the jointed limbs to cause the robot to assume an alternative aggregate orientation in which the particular angle has less than the non-zero threshold value.

2. The method of claim 1, wherein estimating the aggregate orientation of the robot comprises:
   predicting that the robot will be in the aggregate orientation at a future time.

3. The method of claim 1, wherein providing the instructions to control the at least one of the jointed limbs comprises:
   providing the instructions to control the at least one of the jointed limbs to cause the robot to assume the alternative aggregate orientation before the robot assumes the estimated aggregate orientation.

4. The method of claim 1, wherein the non-zero threshold value is a non-zero threshold angle value, and wherein determining that the estimated aggregate orientation is unstable comprises:
determining, based on the estimated aggregate orientation, an angular velocity of the robot; and
determining that the estimated aggregate orientation is unstable further based on the angular velocity having more than a non-zero threshold velocity value.

5. The method of claim 1, wherein determining that the estimated aggregate orientation is unstable comprises:
determining that the particular angle of the estimated aggregate orientation is accelerating.

6. The method of claim 1, wherein estimating the aggregate orientation of the robot comprises:
determining a relationship between the respective joint angles and the body orientation measurement based on a weight distribution of each of the jointed limbs, wherein the relationship represents an extent to which the respective joint angles affect the estimated aggregate orientation.

7. The method of claim 6, wherein the relationship between the respective joint angles and the body orientation measurement indicates a torque applied to the body from moving a given jointed limb of the jointed limbs.

8. The method of claim 1, wherein providing the instructions to control the at least one of the jointed limbs comprises:
determining an extent of force with which to place the at least one of the jointed limbs against a surface in the environment to assume the alternative aggregate orientation; and
providing instructions to place the at least one of the jointed limbs against the surface using the determined extent of force.

9. The method of claim 1, wherein providing the instructions to control the at least one of the jointed limbs comprises:
determining a position to which to move the at least one of the jointed limbs to assume the alternative aggregate orientation; and
providing instructions to move the at least one of the jointed limbs to the determined position.

10. The method of claim 1, wherein the jointed limbs include two legs, and wherein the estimated aggregate orientation represents the robot at a time when the robot is in mid-air above a surface and the two legs are not in contact with the surface, the method further comprising:
determining an angle by which to adjust the at least one of the jointed limbs to cause the robot to assume the alternative aggregate orientation when at least one of the two legs lands on the surface; and
providing instructions to adjust the at least one of the jointed limbs by the determined angle to cause the robot to assume the alternative aggregate orientation.

11. The method of claim 1, further comprising:
determining a desired trajectory for the robot to follow; and
determining modifications to the estimated aggregate orientation to cause the robot to follow the desired trajectory, wherein the alternative aggregate orientation includes the determined modifications.

12. The method of claim 1, wherein the provided instructions are first instructions, the method further comprising:
estimating an angular velocity of the robot based on the estimated aggregate orientation;
receiving a second plurality of measurements indicative of external forces exerted on the robot;
based on the second plurality of measurements and the estimated angular velocity of the robot, determining a component of the estimated angular velocity caused by the external forces exerted on the robot; and
providing second instructions to control at least one of the jointed limbs based on the determined component of the estimated angular velocity caused by the external forces exerted on the robot.

13. A robot comprising:
a body;
a plurality of jointed limbs connected to the body;
a plurality of sensors configured to provide a plurality of measurements indicative of respective joint angles of the plurality of jointed limbs;
a body orientation sensor connected to the body and configured to provide a body orientation measurement indicative of an orientation of the body of the robot;
a control system configured to:
receive, from the plurality of sensors, the plurality of measurements;
receive, from the body orientation sensor, the body orientation measurement;
estimate an aggregate orientation of the robot based on the plurality of measurements and the body orientation measurement;
determine that the estimated aggregate orientation is unstable based on a particular angle of the estimated aggregate orientation having more than a non-zero threshold value, wherein the particular angle is one of a yaw angle, a pitch angle, or a roll angle; and
in response to determining that the estimated aggregate orientation is unstable, control at least one of the plurality of jointed limbs to cause the robot to assume an alternative aggregate orientation in which the particular angle has less than the non-zero threshold value.

14. The robot of claim 13, wherein the control system is configured to estimate the aggregate orientation of the robot by:
predicting that the robot will be in the aggregate orientation at a future time.

15. The robot of claim 13, wherein the control system is configured to control the at least one of the plurality of jointed limbs by:
controlling the at least one of the plurality of jointed limbs to cause the robot to assume the alternative aggregate orientation before the robot assumes the estimated aggregate orientation.

16. The robot of claim 13, wherein the non-zero threshold value is a non-zero threshold angle value, and wherein the control system is configured to determine that the estimated aggregate orientation is unstable by:
determining, based on the estimated aggregate orientation, an angular velocity of the robot; and
determining that the estimated aggregate orientation is unstable further based on the angular velocity having more than a non-zero threshold velocity value.

17. The robot of claim 13, wherein the control system is configured to determine that the estimated aggregate orientation is unstable by:
determining that the particular angle of the estimated aggregate orientation is accelerating.

18. A non-transitory computer readable storage medium having stored thereon instructions that, when executed by a computing device, cause the computing device to perform operations comprising:

receiving, from a plurality of sensors connected to a robot, a plurality of measurements indicative of respective joint angles of jointed limbs connected to a body of the robot;

receiving a body orientation measurement indicative of an orientation of the body of the robot;

estimating an aggregate orientation of the robot based on the plurality of measurements and the body orientation measurement;

determining that the estimated aggregate orientation is unstable based on a particular angle of the estimated aggregate orientation having more than a non-zero threshold value, wherein the particular angle is one of a yaw angle, a pitch angle, or a roll angle; and in response to determining that the estimated aggregate orientation is unstable, providing instructions to control at least one of the jointed limbs to cause the robot to assume an alternative aggregate orientation in which the particular angle has less than the non-zero threshold value.

19. The non-transitory computer readable medium of claim 18, wherein estimating the aggregate orientation of the robot comprises:

predicting that the robot will be in the aggregate orientation at a future time.

20. The non-transitory computer readable medium of claim 18, wherein providing the instructions to control the at least one of the jointed limbs comprises:

providing the instructions to control the at least one of the jointed limbs to cause the robot to assume the alternative aggregate orientation before the robot assumes the estimated aggregate orientation.

* * * * *

UNITED STATES PATENT AND TRADEMARK OFFICE
CERTIFICATE OF CORRECTION

PATENT NO. : 10,105,850 B2
APPLICATION NO. : 15/495905
DATED : October 23, 2018
INVENTOR(S) : Alex Khripin et al.

Page 1 of 1

It is certified that error appears in the above-identified patent and that said Letters Patent is hereby corrected as shown below:

On the Title Page

Following item (63), please insert:
-- STATEMENT REGARDING FEDERALLY SPONSORED RESEARCH OR DEVELOPMENT
This invention was made with Government support under contract number W91CRB-11-C-0048 awarded by the United States Army. The Government has certain rights in the invention. --

Signed and Sealed this
Fifteenth Day of October, 2019

Andrei Iancu
*Director of the United States Patent and Trademark Office*